United States Patent [19]
Zegel

[11] 4,043,055
[45] Aug. 23, 1977

[54] TEACHING AID FOR ACCOUNTING

[76] Inventor: Snyder M. Zegel, 108 Monell Ave., Islip, N.Y. 11751

[21] Appl. No.: 624,005

[22] Filed: Oct. 20, 1975

[51] Int. Cl.² ............................................. G09B 19/18
[52] U.S. Cl. ..................................... 35/24 R; 40/70 R
[58] Field of Search ................. 35/24 R, 24 C; 40/70; 235/113, 114; 273/148 R

[56] References Cited

U.S. PATENT DOCUMENTS

| 544,907 | 8/1895 | Braine et al. | 273/148 R X |
| 986,036 | 3/1911 | Wyndham | 273/148 R |
| 1,000,026 | 8/1911 | Lewis | 273/148 R UX |
| 1,604,572 | 10/1926 | Hausheer | 283/66 R |
| 1,764,063 | 6/1930 | Youngberg | 40/70 R |

FOREIGN PATENT DOCUMENTS 805,374  12/1958  United Kingdom ..................... 40/70

Primary Examiner—Anton O. Oechsle
Attorney, Agent, or Firm—Salvatore A. Alamia

[57] ABSTRACT

A teaching device useful as an aid in teaching the rudimentary principles of accounting comprising at least one triangular journal device bearing accounting indicia thereon and means on said triangular device for recording and displaying accounting data. A plurality of account ledger recording devices are used with the journal device. A label is provided on each recording device so that the number designation and title of an account may be written thereon.

3 Claims, 7 Drawing Figures

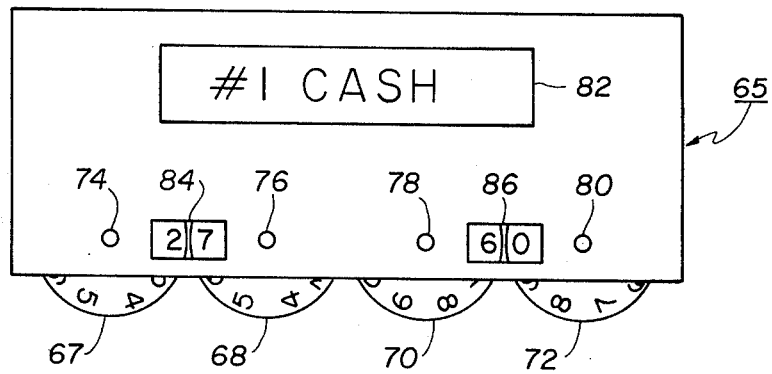
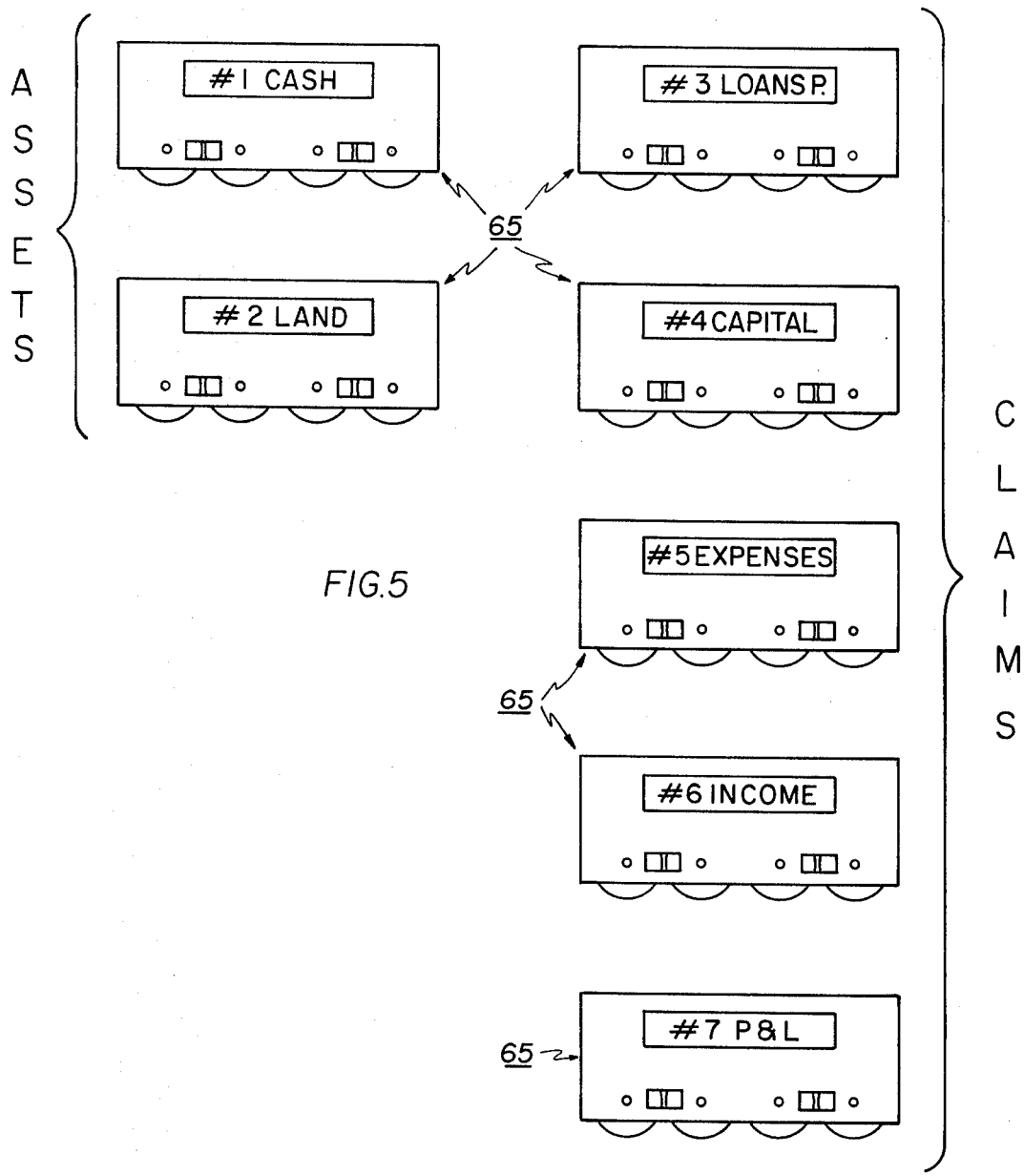

TEACHING AID FOR ACCOUNTING

This invention relates generally to a teaching aid and more particularly to a novel educational device useful as an aid in teaching the rudimentary principles of accounting. The current methods of teaching the double entry system of bookkeeping involve long and detailed formal study. Such methods may be appropriate for those who desire a career in accounting. However, with the increasing complexities in the day to day operations of most businesses, there exists the need for some teaching aid or educational device which is useful as an aid in teaching the rudimentary principles of double entry accounting for the non-professional.

The fundamental accounting equation for any business entity, stated in its simplest terms, is that its assets equal its claims. All forms of property owned by a business entity and to which one can ascribe a money value are called assets. Since credit now plays an important role in business and since credit is often extended to enable a business entity to acquire assets, the law extends to creditors a "primary" claim of the assets. The proprietorship of the business entity may then be viewed as having a "secondary" claim on the assets, i.e. a claim on the assets limited to that left after the "primary" claims have been satisfied.

In accounting, the primary claims are called liabilities and the secondary claims are called equity or capital. Stated in other words, equity or capital is a representation of the net worth of a business entity, measured by the value of the assets less the value of the liabilities. Consequently, the fundamental equation may be expanded to: ASSETS equal LIABILITIES plus CAPITAL.

Generally, it is an object of the present invention to provide a novel teaching aid for simply and effectively demonstrating the rudimentary principles of double-entry accounting.

Specifically, it is an object of the present invention to provide a novel, game-like teaching device for illustrating the inter-relationship of assets, liabilities and capital and the several accounts that may exist under each category.

It is a further object of the present invention to provide novel accounting indicia recording devices to demonstrate the inter-relationship of assets and claims.

The above and other objects of the present invention are accomplished by a novel educational device comprising a body having an uppermost point, and means on said body for recording and displaying accounting indicia.

In a second embodiment, a novel educational device comprising a plurality of account ledger devices, a journal device having an uppermost point, and means for labeling each account ledger device.

While the specification concludes with claims particularly pointing out and distinctly claiming the subject matter of the present invention, the presently preferred embodiments of the invention are described in the following detailed description taken in conjunction with the accompanying drawing in which:

FIG. 4 illustrates a ledger device.

FIG. 5 illustrates an array of ledger devices typical for a small business entity.

Figure 1:
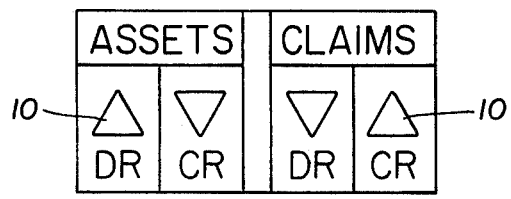
FIG. 1 is a graphic representation of the fundamental accounting equation.

With reference to the drawing, FIG. 1 illustrates a graphic representation of the fundamental accounting equation: Assets equal Claims. It is noted that the arrowhead 10 demonstrates that an increase in Assets would be posted on the debit side of the asset account and an increase in Claims would be posted on the credit side of the claims account. Similarly, the remaining arrowheads indicate the posting of decreases in Assets or Claims.

This graphic representation of the fundamental accounting equation utilizing arrowheads is reproduced on each triangular journal device 12, 22 to assist the student in understanding how each side of the equation is to be debited or credited.

Figure 2A:
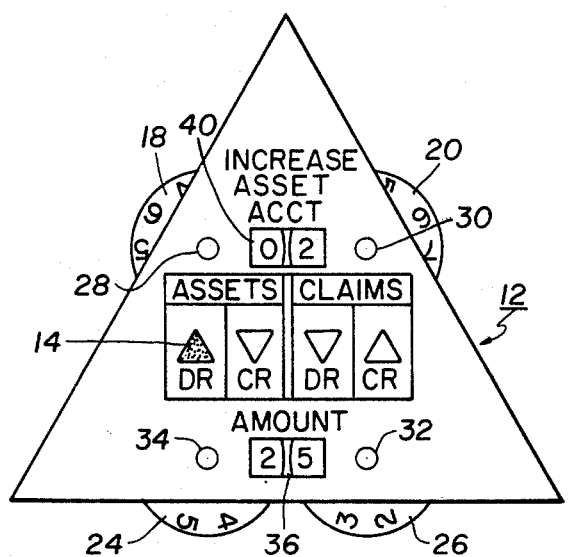
FIG. 2 shows both sides of a triangular journal device.
Figure 2B:
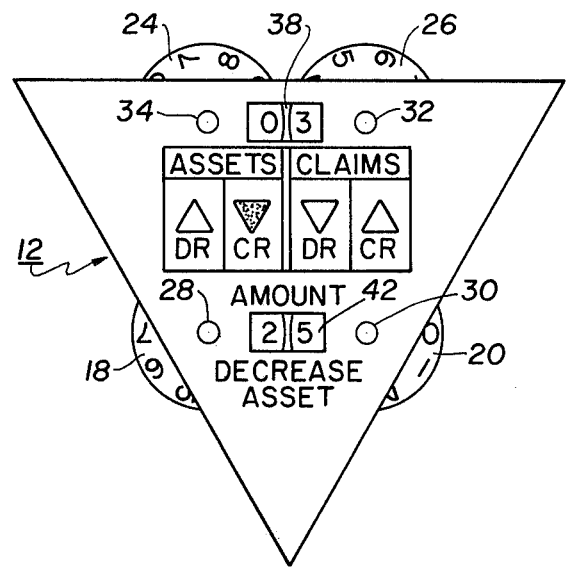

Both sides of a triangular journal device 12 for assets are illustrated in FIG. 2. Side (a) is used for an increase in assets while side (b) is used for a decrease in assets. The shape or configuration of journal devices 12, 22 resemble the arrowheads depicted in FIG. 1 and serve as a further aid to the student. It is noted that the apex of the triangular device is pointed upwards for an increase in assets and reference to the graphic representation thereon indicated to the student that an increase in assets is to be debited. The arrowhead 14 is colored or otherwise filled-in to further assist the student in this regard.

Figure 3A:
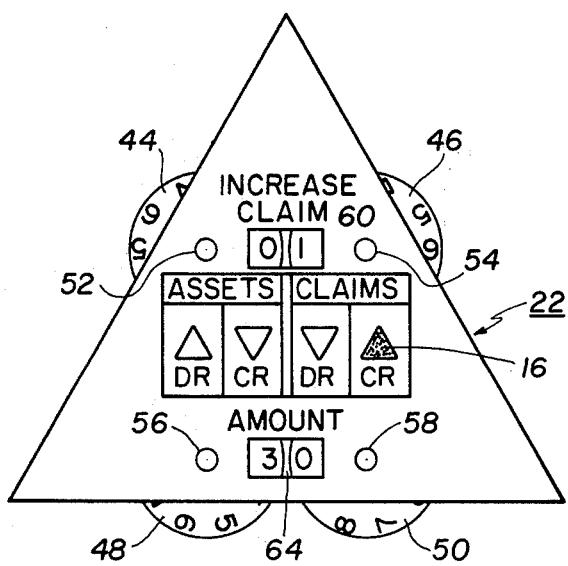
FIG. 3 shows both sides of a second triangular journal device.
Figure 3B:
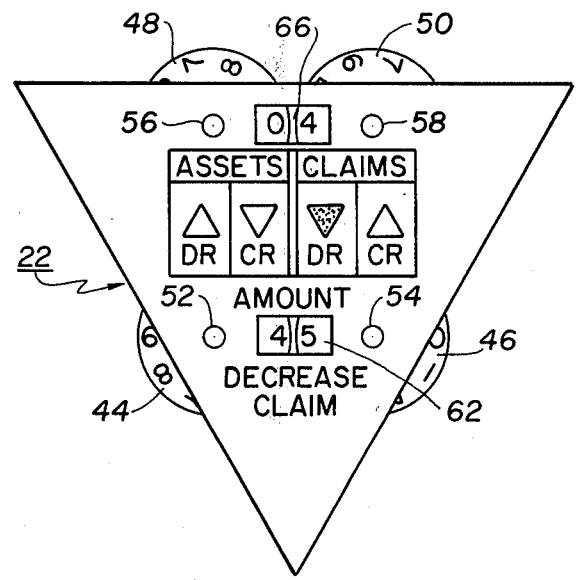

Similarly, FIG. 3 illustrates both sides of a triangular journal device 22 for claims. Side (a) shows an increase in a claim, be it a liability or capital, while side (b) shows a decrease in a claim. In dealing with a transaction that represents an increase in a claim account, the apex of the triangular devices for claims is pointed upwards and arrowhead 16 is colored or filled-in to demonstrate to the student that the entry is to be made on the credit side of the particular account.

Four disks 18, 20, 24, 26 are rotatably attached to triangular journal device 12 by rivets 28, 30, 32, 34. Each disk has, on each face thereof, a circular series of numerals from 0 to 9 inclusive. Furthermore, each disk protrudes slightly from an edge of device 12 so that it may be conveniently turned by the fingers. The numerals on disks 24, 26 are exposed, on one side, through sight window 36 and on the reverse side of device 12 through sight window 38. Similarly, the numerals on disks 18, 20 are exposed through sight windows 40, 42.

In accordance with the present invention, sight window 36 displays the amount to be debited in an asset account. The numerical designation for that particular account is displayed through sight window 40. On the reverse side (side b) of device 12, the numerical designation for a particular asset account is displayed through sight window 38 and the amount to be credited is displayed through sight window 42.

Journal device 22 is similarly constructed. Four disks 44, 46, 48, 50 are rotatably attached to device 22 by rivets 52, 54, 56, 58 and each disk protrudes slightly from an edge of said device 22 so that it may be conveniently turned by the fingers. Disk 44, 46 each have a circular series of numerals from 0 to 9 inclusive on each side thereof which are selectively exposed through sight window 60 on side (a) of device 22 to display the numerical designate of the claims account under consideration. The numerals on the reverse faces of disks 44, 46 are selectively exposed through sight window 62 on side (b) of device 22 to display the amount to be debited in a particular claims account.

Disks 48, 50 also have a circular series of numerals from 0 to 9 inclusive on each face thereof. The numerals exposed through sight window 64 on side (a) of device 22 represent the amount that the account designated in window 60 is to be credited. In like manner, numerals on the reverse face of disks 48, 50 are selectively exposed through sight window 66 on side (b) of device 22 to designate the account to be debited the amount displayed by window 62.

FIG. 4 illustrates a single ledger device 65 representative of an asset account designated No. 1. CASH. Four disks 67, 68, 70, 72 are rotatably attached to device 65 by rivets 74, 76, 78, 80. Each disk has, on the face thereof, a circular series of numerals from 0 to 9 inclusive and protudes slightly from the bottom edge of device 65 whereby each disk may be conveniently turned by the fingers.

Each device 65 represents an account and label 82 is provided on the face of device 65 so that the number designation and title of the account may be written thereon. It is contemplated that the label 82 is of a type where the initial writing may be rubbedoff or otherwise removed and a new number and title may be written thereon.

The numerals on disks 67, 68 exposed through window 84 represent the total debit amount in that account while the numerals on disks 70, 72 exposed through window 86 represent the total credit in that account.

In accordance with the present invention, the triangular totalizer and display devices 12, 22 function as a journal. In double-entry bookkeeping, a journal is a book or record of original entry. A ledger is a book or array of accounts to which debits and credits are posted from the record of original entry, the journal. It is contemplated that the transaction would be first "entered" upon the journal devices 12, 22 displaying thereon the amounts and accounts to be credited and debited. Once the transaction has been completely "entered" upon the journal devices all the amounts are thereafter "posted" to the appropriate account ledger devices.

Although the triangular journal devices 12, 22 have heretofore been described as double-faced, it is understood that the invention is not limited to such a construction. Each facet, of the heretofore described devices may be separate devices. Furthermore it is contemplated as within the scope of this invention that the device may be diamond shaped so that all for modes appear as facets of a single device.

The device of the present invention may be used as either a teaching aid or an educational game. As a teaching device, in the teacher-student environment, the invention enables an instructor to develop a commercial account through a set of facts and the student, using the components of the invention, must accurately balance the transactions of the business for some stated accounting period. As an aducational game, the invention contemplates the inclusion of preestablished fact patterns for a variety of business entities. Each player is given a copy of a specific fact pattern and the object of the game is to quickly and accurately post all transactions, close-out and balance all appropriate accounts and develop a profit and loss picture for the business in question. The first player to accurately complete the bookkeeping assignment is the winner. Answer sheets are provided corresponding to each fact pattern so the players may compare their results with the correct postings and balances.

To illustrate the use of the present invention as a teaching aid, the following transactions of one John Doe, a parking lot proprietor, will be explained, posted and closed-out using the components of the present invention.

John Doe decided to buy a piece of land near the local railroad station to be used as a parking lot. First, he opened a bank account in the business name: John's Parking lot; and, deposited therein $24,000.00 to start his business. Mr. Doe thereafter bought the land desired for $20,000.00 drawn from the business account. During the first quarter of business Mr. Doe had borrowed a total of $6,000.00 and had received $12,000.00 in parking fees. In addition a total of $3,000.00 had been paid out in that period for various operating expenses including printing, advertising and interest on loans. A total of $4,000.00 of the amount borrowed was repaid during that period and Mr. Doe had withdrawn a total of $7,000.00 from the business.

After a review of the fact pattern, the student will select seven ledger devices 65 and write the following numerical designations and titles on the labels 82 provided thereon: No. 1 CASH; No. 2 LAND; No. 3 LOANS PAYABLE; No. 4 CAPTIAL; No. 5 EXPENSES; No. 6 INCOME; No. 7 PROFIT & LOSS. The student thereafter arranges the ledger devices in two columns; asset accounts in one column and claim accounts in a second column as shown in FIG. 5 of the drawing.

The student will then commence to record the several transactions following the normal accounting technique of "entering" first in the journal and thereafter "posting" to the ledger. Accordingly the student will select the assets journal device 12 and orient same to "enter" an increase in assets. The student will manipulate disks 18, 20 to display "01" through sight window 40 representing account "No. 1 CASH" and the amount "24" will be displayed through window 36 by manipulating 24, 26. Since all transactions are in thousands the notation of value is shortened to "24".

The student will then select the claims journal device 22 and orient same to record an increase in claims, CAPITAL. The appropriate disks 44, 46, 48, 50 will be manipulated to display "04" through account window 60 and "24" through amount window 64.

The journal entry for that transaction having been completed, the student will now "post" the amounts to the appropriate accounts of the ledger. As heretofore mentioned, the shape of the journal devices and their resemblence to the arrowheads of FIG. 1 assists the student in understanding whether to debit or credit the particular accounts. Since debits are "posted" first, the student will select the ledger account device 65 labeled "No. 1 CASH" and manipulate disks 67, 68 to display "24" through debit window 84. The student will select the ledger account device 65 labeled "No. 4 CAPITAL" and manipulate disks 70, 72, to display "24" through credit window 86.

All the remaining transactions will be recorded in the same fashion. To "enter" the purchase of land for $20,000.00, the student will orient the assets journal device 12 to record an increase in assets. In the manner explained above, the student will display "02" through account window 40 to represent account "No. 2 LAND" and "20" through amount window 36. The student then orients a second assets journal device 12 to record a decrease in assets, i.e. the use of cash to buy the land. If it is desired to use a single assets journal device, the student must first make a note that account "No. 2 LAND" is to be debited "20" and may then use the reverse side of the same device 12 to record a decrease in assets. In either case, the student will display "01" through account window 38 representing account "No. 1 CASH" and "20" through amount window 42.

The student will then "post" the amounts in the designated ledger accounts. The ledger account device 65 labeled "No. 2 LAND" will be debited $20,000.00 i.e. the student will cause "20" to be displayed through sight window 84. The ledger account device 65 labeled "No. 1 CASH" will now display a "24" through its debit window 84 and a "20" through its credit window 86. This account is said to presently have a debit balance, i.e. an excess of debits over credits, of "04" representing $4,000.00.

The borrowing of $6,000.00 will be recorded next. The student will orient the asset journal device 12 to record an increase in assets. A "01" will be displayed through window 40 representing asset account "No. 1 CASH" and a "06" will be displayed through amount window 36. The claims journal device 22 will be oriented to record an increase in claims. A "03" will be displayed through account window 60 to represent claims account "No. 3 LOANS PAYABLE" and "06" will be displayed through amount window 64.

The student will thereafter "post" the $6,000.00 to the designated account ledger device 65. The ledger account device 65 labeled "No. 1 CASH" will be debited the $6,000.00 by causing the debit total to be increased by "06" to display a total "30" through debit sight window 84 of this particular account device. The ledger account device 65 labeled "No. 3 LOANS PAYABLE" will be credited the $6,000.00 by causing "06" to be displayed through credit window 86 of that particular device 65.

The student must next record the $12,000.00 received in parking fees. The accounts affected are: "No. 1 CASH" (an asset account) and "No. 6 INCOME" (a claim account). First the journal entry is made. The asset journal device 12 will be oriented to record the asset account and amount to be debited, i.e. "01" through account window 40 and "12" through amount window 36. In like fashion, a claim journal device 22 will be oriented to record the claim account and amount to be credited.

The student will then "post" the amounts in the designated ledger accounts. The ledger account device 65 labeled "No. 1 CASH" will be debited $12,000.00 by increasing the amount displayed through debit window 84 by "12" to display "42". The student will credit the ledger account device 65 labeled "No. 6 INCOME" by manipulating disks 70, 72 to display "12" through credit window 86 of this particular ledger account device 65.

In recording these very simple transactions, i.e. making the original journal entries and thereafter "posting" to the appropriate ledger accounts, the teaching devices of the present invention has graphically, as well as, phyically, demonstrated and taught the following accounting principles: (a) an increase in an Asset will be accompanied by either an increase in Capital, an increase in a Liability or a decrease in another Asset; (b) an increase in an Asset is debited while a decrease is credited; (c) an increase in Capital is credited; (d) an increase in a Liability is credited; and (e) a debit is always made to the left side of an account and a credit to the right, regardless of whether it is an asset or claim account.

To record the $3,000.00 paid for misc. expenses, the student selects the claim journal device 22 and orients same to "enter" a decrease in a claim. Disks 48, 50 are manipulated to display "05" through account window 66 and disks 44, 46 are manipulated to display "03" through amount window 62. In like fashion, the student "enters" the amount "03" through amount window 42 of journal 12 oriented to record a decrease in an asset. A "01" is displayed through account designation window 38.

The student then proceeds to "post" these amounts to the designated ledger accounts. The ledger account device 65 labeled "No. 5 EXPENSES" is debited $3,000.00 by displaying "03" through debit window 84 thereof and the ledger account device 65 labeled "No. 1 CASH" is credited $3,000.00 by increasing the amount displayed through credit window 86 of that particular device to "23".

A claim journal device 22 to record a decrease in a claim and an asset journal device 12 to record a decrease in an asset are utilized to "enter" the repayment of $4,000.00 on the outstanding loan. In the manner hereinabove explained, "03" is displayed through window 66 and "04" is displayed through window 62 of device 22. Then the student "enters" the amount "04" in window 42 and account "01" in window 38 of device 12. This transaction is thereafter "posted" to the designated ledger accounts. A "04" is displayed through debit window 84 of ledger account device 65 labeled "No. 3 LOANS PAYABLE" and the "23" in window 86 of ledger account device 65 labeled "No. 1 CASH" is increased to "27".

Finally, the student must record the $7,000.00 withdrawn by Mr. Doe. The student will use a claim journal device 22 (side for decreases) and an asset journal device 12 (side for decreases) in making the journal entries. A "07" is displayed through amount window 62 and a "04" is displayed through account window 66. The credit entry is made by displaying "07" through amount window 42 and "01" through account window 38. The student thereafter "posts" the "07" to the debit side (window 84) of claim account "No. 4 CAPITAL" and increases the credit side of account "No. 1 CASH" by increasing the amount displayed through credit window 86 of the device 65 for that particular account to "34".

Thus, all transactions for the period under study have been "posted". The student must now balance each account by recording the excess of either debits or credits. If the debits exceed the credits in a particular account, the difference is called a "debit balance". The reverse situation yields a "credit balance" for the particular account. If all entries were properly made, the total of the debit balances will equal the total of all credit balances. If this "trial balance" criteria is satisfied, the student will close-out the temporary accounts to determine profit or loss for the business during the period under study.

In closing out a temporary account its balance must be brought to zero. Accordingly, an "03" is displayed through the debit window 84 of the account ledger device 65 labeled "No. 7 PROFIT & LOSS" and the account "No. 5 EXPENSES" is credited the same "03" by displaying same through credit window 86 of that account ledger device 65. Similarly, Parking Income is debited and Profit and Loss is credited an equal amount:

"12". After both temporary accounts are closed, the student will strike a balance for the Profit and Loss summary account. Under the facts in the example being considered, the Profit and Loss account results in a credit balance of "9", i.e. the business showed a profit of $9,000.00 during the period.

Since the Profit and Loss summary account is similarly a temporary account, it too must be closed-out and its balance transferred to the permanent Capital account. Consequently, in the manner heretofore explained, Profit and Loss is debited "9" and Capital is credited "9". The student may now prepare a postclosing trial balance which should compare favorably with that held by the instructor.

The foregoing description is intended to be merely illustrative of presently preferred embodiments of the present invention within an exemplary environment. A latitude of modification, change and substitution is intended wherein some features of the invention will be employed without a corresponding use of other features so described herein. Accordingly, various modes of carrying out the invention are contemplated as being within the scope of the following claims.

I claim:

1. A teaching device useful as an aid in teaching the rudimentary principles of accounting comprising:
   a. a plurality of account ledger recording devices;
   b. means for labeling each account ledger recording device;
   c. a triangular journal device bearing accounting indicia thereon;
   d. a plurality of disks bearing numerals thereon and rotatably attached to said journal device; and
   e. window means on said journal device for displaying therethrough the numerals on said disks representing the amount to be posted to a particular account ledger recording device.

2. A teaching device according to claim 1 wherein each ledger recording device includes: a plurality of rotatable disks bearing numerals; and, means for displaying the numerals on said disks to represent the accummulated debit and credit totals of that account.

3. A teaching device useful as an aid in teaching the rudimentary principles of accounting comprising:
   a. a plurality of account ledger recording devices;
   b. means for labeling each account ledger recording device;
   c. a triangular asset journal device bearing accounting indicia thereon;
   d. a triangular claims journal device bearing accounting indicia thereon
   e. each journal device including: a plurality of rotatable disks bearing numerals, and means for displaying the numerals on said disks to represent the amount to be posted from each journal device to the account ledger recording device.

* * * * *